United States Patent [19]

Sakuramoto et al.

[11] Patent Number: 5,209,796

[45] Date of Patent: May 11, 1993

[54] METHOD OF MAKING A BURNED PATTERN

[75] Inventors: Takafumi Sakuramoto; Takashi Tominaga; Megumi Ashida, all of Osaka, Japan

[73] Assignee: Nitto Denko Corporation, Osaka, Japan

[21] Appl. No.: 919,392

[22] Filed: Jul. 29, 1992

Related U.S. Application Data

[63] Continuation of Ser. No. 537,962, Jun. 13, 1990, abandoned.

[30] Foreign Application Priority Data

Jun. 16, 1989 [JP] Japan .................. 1-154856
Oct. 17, 1989 [JP] Japan .................. 1-271172

[51] Int. Cl.$^5$ .................................................. B32B 7/12
[52] U.S. Cl. ......................................... 156/89; 156/240; 420/28; 428/346; 428/352
[58] Field of Search .............. 156/82, 89, 155, 233, 156/234, 240, 264, 277, 306.6; 420/28; 428/343, 346, 352

[56] References Cited

U.S. PATENT DOCUMENTS

| | | | |
|---|---|---|---|
| 4,068,033 | 1/1978 | Meade | 156/89 |
| 4,458,307 | 5/1984 | Zimmer | 156/89 |
| 4,825,539 | 5/1989 | Nagashima et al. | 156/89 |
| 4,888,230 | 12/1989 | Cutright | 156/89 |
| 5,008,151 | 4/1991 | Tominaga et al. | 428/440 |

*Primary Examiner*—Robert A. Dawson
*Assistant Examiner*—David Reifsnyder
*Attorney, Agent, or Firm*—Sughrue, Mion, Zinn, Macpeak & Seas

[57] ABSTRACT

A method of producing a burned pattern by bonding a burning pattern to a substrate through an inorganic powder sheet obtained by shaping an inorganic powder such as glass and a ceramic material into a sheet with a resin binder and burning the bonded body, characterized in that the inorganic powder sheet is bonded to the substrate by heating and/or pressurizing or an adhesive force.

6 Claims, No Drawings

METHOD OF MAKING A BURNED PATTERN

This is a continuation of application Ser. No. 07/537,962 filed Jun. 13, 1990, now abandoned.

FIELD OF THE INVENTION

The present invention relates to a method of producing a burned pattern which is formed on an inorganic baking layer or the like and which is useful as an identification label or the like.

DESCRIPTION OF THE PRIOR ART

In the recent trend in the manufacturing system in which the change from mass production to low-volume production of many kinds of items is progressive, it is important to provide identification labels excellent in heat resistance, durability and chemical resistance which are used for managing products, semimanufactures or parts of a metal, glass or burned ceramic material.

A method of producing a burned pattern used for an identification label or the like by directly applying a pattern of a burning ink containing a glass powder onto a metal substrate such as aluminum by screen printing or by applying the ink to transfer paper and transferring the pattern to the substrate, and burning the substrate is conventionally known.

This method, however, has problems such as the poor production efficiency derived from a large number of steps required before providing the burning pattern and the difficulty in application to a bent substrate or the like. In addition, this method is disadvantageous in that it is difficult to coat the entire surface of a metal substrate with the burned layer while keeping the chemical resistance, and in that preliminary surface treatment such as the oxidization of the substrate is required in order to bond the burned pattern to a metal substrate. If an enamel substrate is used, it is possible to provide the burned pattern with chemical resistance, but bonding the burned pattern becomes more difficult in this case, and the step of enamelling the substrate further lowers the production efficiency.

SUMMARY OF THE INVENTION

As a result of studies undertaken by the present inventors, it has been found that the above-described problems in the prior art can be overcome by a system in which a pattern is provided through an inorganic powder sheet and thereafter burned.

It has, however, also been found that if this system using a sheet as a medium is applied to a substrate of an iron alloy such as stainless steel, the adhesion between the sheet burned layer and the substrate is sometimes poor. That is, in the system using a sheet as a medium, the reflectivity of the sheet burned layer is low due to the influence of the cinders of an organic material or the iron substrate as an underplated layer below the burned pattern, so that the pattern is sometimes difficult to discriminate due to the poor reflection density ratio (PSC value). This tendency is strong especially in the sheet containing a glass powder as the base. In an identification label, a high quality of identifying the pattern is required, so that the problem of pattern discrimination is important. Use of a large amount of coloring agent can enhance the PSC value and, hence, the pattern discriminating quality. It has been found, however, that use of a large amount of coloring agent lowers the adhesion between the sheet burned layer and the iron substrate. Accordingly, it is an object of the present invention to eliminate these problems and to provide a method of producing a burned pattern having an excellent adhesion in spite of using a large amount of coloring agent.

As a result of further studies, the present inventors have succeeded in producing an inorganic powder sheet having an excellent adhesion with a substrate by providing a substrate with a burning pattern through an inorganic powder sheet produced by shaping an inorganic powder into a sheet with a resin binder, and burning the sheet after providing an adhesive layer on the surface of the inorganic powder sheet which is brought into contact with the substrate or after heating and/or pressurizing the sheet.

In other words, the present invention provides a method of producing a burned pattern comprising the steps of bonding a burning sheet composed of an inorganic powder sheet produced by shaping an inorganic powder into a sheet with a resin binder and having a burning pattern on one side thereof to a substrate by the adhesive force of the resin binder under heating and/or pressurizing, and burning the sheet, and a method of producing a burned pattern comprising the steps of bonding the burning sheet to the substrate by the adhesive force of the resin binder under heating and/or pressurizing, providing the inorganic powder sheet with a burning pattern so as to make a burning sheet, and burning the sheet.

The present invention also provides a method of producing an iron substrate provided with a burned pattern comprising the steps of preparing an iron substrate by heat-treating an aluminum-containing iron alloy so as to modify the aluminum into alumina and increase the alumina concentration in the surface layer thereof, producing an inorganic powder sheet by shaping an inorganic powder into a sheet with a resin binder and providing a burning pattern on one side thereof, bonding the iron organic powder sheet to the iron substrate through an adhesive layer, and burning the bonded body.

DETAILED DESCRIPTION OF THE INVENTION

By providing a substrate with a burning pattern through an inorganic powder sheet and thereafter burning the sheet, the sheet is firmly bonded to the substrate during the burning process and fused with the burned pattern into one body, whereby the burned pattern is firmly bonded to the substrate with the inorganic powder baked layer.

In the case of using an iron alloy for the substrate, a burning pattern is provided for the substrate through an inorganic powder sheet. The sheet is bonded to the iron substrate during the burning process, and fused with the burned pattern into one body, whereby the burned pattern is firmly bonded to the iron substrate with the inorganic powder baked layer.

In this case, by using an iron substrate of an aluminum-containing alloy heat-treated so as to modify the aluminum into alumina and increase the alumina concentration in the surface layer thereof, the alumina acts as an accelerator for melting the inorganic powder sheet, and lowers the melt temperature and melt viscosity. As a result, it is possible onto bake the sheet to the iron substrate with adequate adhesion even if an increased amount of coloring agent is mixed in, and a high reflectivity of the sheet burned layer and a high PSC value with respect to the burned pattern is achieved.

The inorganic powder sheet used in the present invention is produced by shaping an inorganic powder into a sheet with a resin binder.

As an inorganic powder, a powder which is softened or melted and bonded to a substrate at a temperature lower than the melt temperature of the substrate is used. Generally, a glass powder or a ceramic mixture powder which is vitrified during the burning process is used. When an iron alloy substrate is used, a glass powder is generally used. A glass powder which is softened or melted at 400° to 1,000° C., for example, lead glass, lead borosilicate glass and soda glass powders are preferably used.

An ingredient of a burned body other than an inorganic powder may be mixed with an inorganic powder sheet. The ingredient of a burned body other than an inorganic powder is taken into the softened or molten inorganic powder during the process of burning the inorganic powder sheet and constitutes the burned body.

As an ingredient of a burned body other than an inorganic powder and binder may be included in the inorganic materials composed of different kinds of ceramic materials, metals and alloys which have a melting point higher than the burning temperature, and inorganic powders and fibers composed of the oxides thereof are generally used. A powder having a particle diameter of 0.1 to 20 $\mu$m, and a fiber having the same diameter and a length of not more than 100 $\mu$m are appropriate, but the ingredient in the present invention is not restricted thereto. The types and combinations of the formulation ingredients may be appropriately determined. From the point of view of coloring, the use of an inorganic coloring agent composed of a pigment or a filler is appropriate. Examples thereof are white materials such as silica, calcium carbonate, titanium oxide, zinc white, zirconia, calcium oxide, alumina, and metal compounds such as a carbonate, nitrate and sulfide which are oxidized into such an oxide at a temperature not higher than the burning temperature; red materials such as manganese oxide.alumina, chromium oxide.tin oxide, iron oxide, and cadmium oxide.selenium sulfide which contain metal ions such as iron, copper, gold, selenium and chrome; blue materials such as cobalt oxide, zirconia.vanadium oxide, and chromium oxide.divanadium pentoxide which contain metal ions such as manganese, cobalt, copper and iron; black materials such as chromium oxide.cobalt oxide.iron oxide.manganese oxide which contain metal ions such as copper, iron, manganese, chrome and cobalt; yellow materials such as zirconium.silicon. praseodymium, vanadium.tin and chromium.titanium.antimony which contain metal ions such as vanadium, tin, zirconium, chrome, titanium, aluminum, cobalt and calcium; green materials such as chromium oxide, cobalt.chromium, and alumina. chromium which contain metal ions such as chromium, aluminum, cobalt and calcium; and pink materials such as aluminum.manganese, and iron.silicon.zirconium which contain metal ions such as iron, silicon, zirconium, aluminum and manganese.

The appropriate amount of ingredient of a burned body other than an inorganic powder used is not more than 150 parts by weight, in particular, 2 to 45 parts by weight per 100 parts by weight of the inorganic powder from the points of view of the friction resistance, the durability, and the chemical resistance of the burned layer formed and the adhesion between the burned layer and the iron substrate. The reflectivity of the burned layer, which is adjustable in correspondence with the amount of inorganic coloring agent used, may be set as desired in accordance with the purposes of use. If the burned pattern is used as an identification label, it is preferable to determine the mixing amount of inorganic coloring agent so that the reflectivity of the burned layer is not less than 50% so as to discriminate the pattern clearly.

As the resin binder, a resin which is burned out during the burning process is used. In the case of bonding an inorganic powder sheet to the substrate under heating and/or pressurizing through a resin binder, a resin having a glass transition point of not higher than 80° C. is appropriate. If the glass transition temperature is too high, the bonding strength for bonding the inorganic powder sheet to the substrate under heating and/or pressurizing is insufficient, which leads to the shrinkage of the sheet and the foaming at the insufficiently bonded part during the burning process, thereby making it difficult to form a good burned pattern. It is possible to adjust the glass transition temperature by adding a plasticizer. Examples of such a resin are a hydrocarbon resin, vinyl or styrene resin, acetal resin, butyral resin, acrylic resin, polyester resin, urethane resin, cellulose resin and rubber resin. Resins which are easily burned out during the burning process are preferably used, and from this point of view, a hydrocarbon resin, acetal resin, acrylic resin and cellulose resin are preferable. Especially, an acrylic resin is preferable.

An inorganic powder sheet is produced by mixing at least one kind of ingredient of a burned body and a resin binder with an organic solvent, and spreading the mixed liquid. The amount of resin binder used is so determined that the inorganic powder sheet produced can be bonded to the substrate by the adhesive force of the resin binder under heating and/or pressurizing. It is generally 10 to 100 parts by weight, preferably 20 to 50 parts by weight per 100 parts by weight of the ingredient of a burned body. Use of too small an amount of resin binder may cause a bonding defect, while when an excessive amount of resin binder is used, the thermal decomposition product sometimes causes a cracking and foaming.

The thickness of the inorganic powder sheet produced may be determined as desired. It is generally 10 to 500 $\mu$m, especially, 30 to 100 $\mu$m. If the thickness is too small, the sheet is difficult to handle, while too thick a sheet is apt to cause a burning defect such as foaming on the burned layer.

The burning sheet in the present invention is produced by providing a burning pattern on one side of an inorganic powder sheet.

A burning pattern may be provided on the inorganic powder sheet by using a burning ink. It is also possible to provide a burning pattern on the inorganic powder sheet by blanking a pattern forming sheet having a similar composition to that of the inorganic powder sheet or engraving a pattern composed of holes or projections on such a pattern forming sheet and bonding the pattern forming sheet to the inorganic powder sheet through an adhesive layer or the like. Alternatively, a pattern composed of holes or projections may be engraved directly on the inorganic powder sheet itself. In this case, the inorganic powder sheet itself with the engraved pattern formed thereon functions as a burning sheet. Accordingly, the inorganic powder sheet having a burning pattern on one side thereof in the present invention includes the inorganic powder sheet having a pattern composed of through holes.

The burning ink is prepared so that the burned ink firmly adheres to the inorganic powder sheet during the burning process. Such a burning ink is ordinarily produced by mixing at least one kind of inorganic coloring agent together with an appropriate additive such as a ceramic powder, binder, plasticizer and dispersant, if necessary, in a ball mill or the like into a fluid in the form of a paste or the like. The typical example thereof is an ink in the form of a paste which is produced by mixing a glass powder and a given ingredient such as an inorganic pigment or an organic glass pigment singly with a binder and which is conventionally used for a directly application system such as screen printing, and a system for transferring a pattern applied on transfer paper.

The composition of the burning ink may be appropriately determined in consideration of the contrast with the inorganic powder sheet and the adhesiveness. The ingredients which remain during the burning process and constitute the burning pattern are generally composed of 1 to 100 wt % of an inorganic coloring agent, and 99 to 0 wt % of an inorganic powder, preferably a glass powder. The inorganic coloring agent and inorganic powder used for preparing the burning ink are similar to those for the inorganic powder sheet.

As the binder for the burning ink, a wax or a resin which is burned out by the thermal decomposition or the like at a temperature not higher than the burning temperature or the like is used. As examples of a wax preferably used will be cited a paraffin wax, natural wax, ester wax, higher alcohol wax and higher amide wax. As a resin, the resin binders used for the inorganic powder sheet are usable. If the characteristics such as the thermal decomposition temperature of the binder for the burning ink are greatly different from those of the resin binder for the inorganic powder sheet, a defect in the external appearance of the burned body such as foaming and deformation is apt to be caused. For this reason, it is preferable to use the same kind of the resin binder as the binder for the burning ink and inorganic powder sheet. The appropriate amount of binder used as occasion demands is 5 to 80 wt % of the ingredient of the burned body.

The method of forming a burning pattern on the inorganic powder sheet in the burning ink is not specified. An appropriate pattern forming method may be adopted such as a handwriting a method, method of applying the ink through a pattern forming mask, a method of transferring the pattern formed on transfer paper, and a method of using an ink jet type printer. The burning pattern formed may also be selected as desired. For example, a printed pattern, transferred pattern, design pattern, bar code pattern, and circuit pattern may be provided on the burning sheet. An ink sheet such as a printing ribbon which is necessary for forming a pattern by a printer such as an X-Y plotter, wire dot printer, thermal transfer type printer and an impact type printer is produced, for example, by applying the burning ink to a supporting member such as a film and a cloth or immersing the supporting member in the burning ink so that the supporting member retains the burning ink. As the supporting member, a conventional material may be used. For example, a plastic film such as a polyester, polyimide and fluorine resin film, and a cloth made of nylon or polyester fibers are usable. A method of forming a pattern by a printer is advantageous in that an appropriate pattern is formed with accuracy and efficiency.

A burning pattern may be provided on the inorganic powder sheet in the burning ink either before or after the inorganic sheet is bonded to the iron substrate through an adhesive layer. In the case of providing the burning pattern by a printer, a burning sheet produced by providing a pattern on the inorganic powder sheet is generally bonded to the iron substrate. In the case of providing a pattern on the inorganic powder sheet in advance, a separator may be pasted on the surface on which the burning pattern is formed, if necessary, for the purpose of protection until the burning process. In the transfer system, the transfer paper may be pasted on the surface as it is in place of the separator.

The type of the pattern, the blanking method or engraving method, and the stage of providing the burning pattern in the case of providing a burning pattern by blanking the pattern forming sheet or engraving a pattern composed of holes or projections on the pattern forming sheet or the inorganic powder sheet itself are not restricted as in the case of providing the pattern by using a burning ink. The method of bonding the burning sheet provided with an engraved pattern onto the iron substrate is advantageous in that it is easy to provide a fine pattern by using an appropriate engraving device.

In the present invention, the burning sheet or the inorganic powder sheet is bonded to the substrate under heating and/or pressurizing by utilizing the adhesive force of the resin binder in a ceramic green sheet. The heating means and the pressurizing means may be determined as desired. For example, a method of heating the substrate and bringing out the adhesive force of the resin binder with the heat may be adopted. In the case of bonding the burning sheet provided with the engraved pattern under pressurizing, the pressure is so set as not to substantially impair the engraved pattern.

The burning sheet or the inorganic powder sheet is bonded to the iron metal substrate through an adhesive layer.

For the adhesive layer, a rubber adhesive, an acrylic adhesive, or a vinylalkyl ether adhesive is preferably used. Examples of especially preferable adhesives are a rubber adhesive composed of a monopolymer such as natural rubber, a synthetic resin of the same system, butyl rubber, polyisoprene rubber, styrene.butadiene rubber and styrene.isoprene.styrene block copolymer rubber; a rubber adhesive produced by adding 10 to 300 parts by weight of a tackifier such as a petroleum resin, terpene resin, rosin resin, xyrene resin and cumarone-indene resin, and other additives such as a softening agent, antioxidant, coloring agent and filler to 100 parts by weight of such a polymer additive; and an acrylic adhesive mainly containing a polymer composed of an alkyl ester of an acrylic acid or a methacrylic acid.

The adhesive layer may be provided on the inorganic powder sheet, the burning sheet or the iron substrate at an appropriate stage. It is preferably provided on one side of the inorganic powder sheet in advance because it facilitates the adhesion of the inorganic powder sheet to the iron substrate and enhances the efficiency of providing the adhesive layer. For providing the adhesive layer, an appropriate method may be selected which is adopted for producing an adhesive tape or the like such as a method of applying an adhesive by an appropriate applicator and a method of transferring an adhesive layer provided on a separator. The thickness of the adhesive layer is ordinarily 5 to 50 μm, preferably 8 to 20 μm. If it is too thin, the adhesive force is inadequate, while if it is too thick, the adhesive layer may slip off during the burning process or a burning defect is apt to be produced. In the case of providing the adhesive layer on the inorganic powder sheet in advance, a separator or the like may be pasted on the adhesive layer for the purpose of protection until it is bonded to the iron substrate.

As the substrate, a substrate of a given shape composed of a heat-resistant material such as a ceramic, glass and metal material may be used. A molded boy of a ceramic powder may also be used as the substrate. For a metal substrate, an iron alloy containing aluminum, chrome or the like is preferably used.

The iron substrate preferably used in the present invention is obtained by heat-treating an aluminum-containing iron alloy so as to modify the aluminum into alumina and increase the alumina concentration in the surface layer thereof. For example, when an iron alloy such as stainless steel containing 1 to 20 wt %, preferably 3 to 15 wt % of aluminum is heat-treated at 500° to 1,200° C., the surface layer (the portion 0.1 to 10 μm deep from the surface) contains 3 to 40 wt % of alumina. The aluminum contained in the iron substrate reacts with the ceramic component, preferably, glass component, especially, lead glass component in the inorganic powder sheet and firmly bonds with the inorganic powder sheet. The form of the substrate is generally a foil or a plate, but not restricted thereto.

The bonded body of the burning sheet and the iron substrate through the adhesive layer is burned under an appropriate burning condition in accordance with the burning temperature of the inorganic powder sheet. The binder, the adhesive layer and the like are burned out during the burning process, and the ingredient of the burned body in the burning sheet becomes a burned body provided with the pattern. Consequently, a burned pattern is obtained which is composed of the inorganic powder sheet and the burning pattern fused into one body and firmly bonded to the iron substrate. The inorganic powder sheet or the burning sheet may be bonded to the iron substrate in such a manner as to surround the entire body of the iron substrate.

The iron substrate provided with the burned pattern obtained is preferably used as an identification label, or an indication plate or decoration plate. The iron substrate provided with the burned pattern is attached to an object of attachment by an adhesive, caulking or another appropriate method. When the object to which the iron substrate is attached is made of a metal, welding or soldering may be adopted for attachment.

According to the present invention, since a burning pattern is provided through an inorganic powder sheet and the sheet is thereafter burned, it is easy to firmly bond the burned pattern to an iron substrate. The method of bonding the sheet to the substrate through an adhesive layer is easily applicable to a bent portion, thereby enhancing the production efficiency. In addition, since it is easy to surround the entire surface of the substrate, it is easy to provide chemical resistance as well as durability and heat resistance. It is also easy to provide a given pattern as desired.

Furthermore, since an organic substrate obtained by heat-treating an aluminum-containing iron alloy so that alumina is contained on the surface or in the surface layer is used, it is possible to firmly bond the burned layer to the iron substrate even if a large amount of inorganic coloring agent is mixed in. As a result, it is possible to enhance the reflectivity of the burned layer and achieve a high PSC value with respect to the burned layer.

EXAMPLE 1

100 parts ("part" means "part by weight" hereinunder) of lead borosilicate glass powder, 20 parts of titanium oxide, 20 parts of polyisobutyl methacrylate, 1 part of stearic acid, 2 parts of dibutyl phthalate and 45 parts of toluene were mixed in a ball mill, and the mixture was spread by a doctor blade and dried to obtain an inorganic powder sheet 60 μm thick. On one side of the inorganic powder sheet, an adhesive layer of 15 μm thick composed of an acrylic adhesive was formed and a bar code pattern composed of a burning ink was printed on the other side through a pattern mask and dried to obtain a burning sheet. The burning ink used was a mixture of 20 parts of chromium oxide.iron oxide.cobalt oxide black pigment, 10 parts of polyisobutyl methacrylate and 20 parts of toluene.

A stainless steel foil (200 μm thick) containing 5% of Al and 20% of Cr was heat treated at 900° C. for 30 minutes so that the foil contained 10.43 wt % (XMA) of alumina in the surface layer. The burning sheet was bonded to the thus-treated stainless steel foil through the adhesive layer, and the temperature was raised at a rate of 10° C./min so as to burn the bonded body at 600° C. for 20 minutes (in air). The organic ingredients such as polyisobutyl methacrylate and the acrylic adhesive were burned out during the burning process.

In this way, the stainless steel foil with the burned pattern of a clear black bar code firmly bonded therewith was obtained. The burned pattern was composed of the bar code pattern fused to the surface of the burned layer of the inorganic powder sheet into one body.

COMPARATIVE EXAMPLE

A stainless steel foil (containing 5.00 wt % of alumina in the surface layer) with the burned pattern was obtained in the same way as in Example 1 except for using a stainless steel foil (containing 5.00 wt % of alumina in the surface layer) without modifying the aluminum into alumina by heat treatment. The state in which the burned pattern was fused was bad.

EXAMPLE 2

90 parts of lead borosilicate glass powder, 10 parts of titanium oxide, 30 parts of polyisobutyl methacrylate having a glass transition temperature of 40° C., 1 part of stearic acid, 3 parts of dibutyl phthalate and 50 parts of toluene were mixed in a ball mill, and the mixture was spread by a doctor blade and dried to obtain a ceramic green sheet 60 μm thick. On one side of the ceramic green sheet, a bar code pattern composed of a burning ink was printed through a pattern mask and dried to obtain a burning sheet. The burning ink used was a mixture of 20 parts of chromium oxide.iron oxide.cobalt oxide black pigment, 10 parts of polybutyl methacrylate and 20 parts of toluene.

On a hot plate heated to 60° C., the back surface of the burning sheet was bonded to a stainless steel foil (200 μm thick) containing 5% of Al and 20 % of Cr and the temperature was raised at a rate of 10° C./min so as to burn the bonded body at 600° C. for 30 minutes (in air). The organic ingredients such as polybutyl methacrylate were burned out during the burning process.

In this way, the stainless steel foil with the burned pattern of a clear black bar code firmly bonded therewith was obtained. The burned pattern was composed of the bar code pattern fused to the surface of the burned layer of the ceramic green sheet into one body.

EXAMPLE 3

85 parts of lead borosilicate glass powder, 15 parts of titanium oxide, 30 parts of polyisobutyl methacrylate having a glass transition temperature of 30° C., 1 part of stearic acid, 3 parts of dibutyl phthalate and 55 parts of toluene were mixed in a ball mill, and the mixture was spread by a doctor blade and dried to obtain a ceramic green sheet 50 μm thick. On one side of the ceramic green sheet, a bar code pattern composed of a burning ink was printed through a pattern mask and dried to obtain a burning sheet. The burning ink used was a mixture of 20 parts of cobalt black pigment, 20 parts of polybutyl methacrylate and 20 parts of toluene.

On a hot plate heated to 50° C., the back surface of the burning sheet was bonded to a 96 wt % alumina substrate (1 μm thick) and the temperature was raised at a rate of 10° C./min so as to burn the bonded body at 800° C. for 30 minutes (in air). The organic ingredients such as polyisobutyl methacrylate were burned out during the burning process.

In this way, the alumina substrate with the burned pattern which was composed of a clear black bar code pattern fused to the surface of the burned layer of the ceramic green sheet into one body firmly bonded therewith was obtained.

EVALUATION TEST

A dolly was bonded to the burned pattern layer of the stainless steel foil provided with the burned pattern obtained in Example 1 and Comparative Example 1 through an epoxy resin adhesive layer. The dolly was pulled in the direction perpendicular to the plane of the burned pattern layer at a rate of 10 mm/min so as to measure the adhesive force between the burned glass layer and the stainless steel foil. The results are shown in Table 1.

TABLE 1

|  | Example 1 | Comparative Example |
|---|---|---|
| Adhesive force (g/cm$^2$) | 1280 | 977 |

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of producing a burned pattern comprising the steps of: bonding a burning sheet composed of an inorganic powder sheet produced by shaping an inorganic powder into a sheet with a resin binder and having a burning pattern on one side thereof to an aluminum-containing iron alloy substrate prepared by heat-treating an aluminum-containing iron alloy so as to modify the aluminum into alumina and increase the alumina concentration in the surface layer thereof, by the adhesive force of said resin binder under heating, pressurizing, or heating and pressurizing; and burning said burning sheet.

2. A method according to claim 1, wherein said burning pattern is composed of a burning ink containing 1 to 100 parts by weight of an inorganic coloring agent selected from the group consisting of ceramic materials, metals and alloys and 99 to 0 parts by weight of a glass powder.

3. A method of producing a burned pattern comprising the steps of: bonding a burning sheet composed of an inorganic powder sheet produced by shaping an inorganic powder into a sheet with a resin binder to an aluminum-containing iron alloy substrate prepared by heat-treating an aluminum-containing iron alloy so as to modify the aluminum into alumina and increase the alumina concentration in the surface layer thereof, by the adhesive force of said resin binder under heating, pressurizing, or heating and pressurizing; providing said inorganic powder sheet with a burning pattern so as to make a burning sheet; and burning said burning sheet.

4. A method according to claim 3, wherein said burning pattern is composed of a burning ink containing 1 to 100 parts by weight of an inorganic coloring agent and 99 to 0 part by weight of an inorganic powder.

5. A method for producing a burned pattern comprising the steps of: preparing an aluminum-containing iron alloy substrate by heat-treating an aluminum-containing iron alloy so as to modify the aluminum into alumina and increase the alumina concentration in the surface layer thereof; providing a burning pattern on one side of an inorganic powder sheet, said burning pattern comprising an inorganic powder and a resin binder; bonding said inorganic powder sheet to said iron substrate through an adhesive layer to form a bonded body; and burning said bonded body.

6. A method according to claim 5, wherein said burning pattern is composed of a burning ink containing 1 to 100 parts by weight of an inorganic coloring agent selected from the group consisting of ceramic materials, metals and alloys and 99 to 0 parts by weight of a glass powder.

* * * * *